US011957220B2

(12) United States Patent
Taton

(10) Patent No.: US 11,957,220 B2
(45) Date of Patent: Apr. 16, 2024

(54) END PIECE

(71) Applicant: LVMH Swiss Manufactures SA, La Chaux-de-Fonds (CH)

(72) Inventor: Laurent Taton, Hong Kong (CN)

(73) Assignee: LVMH SWISS MANUFACTURES SA, La Chaux-de-Fonds (CH)

(*) Notice: Subject to any disclaimer, the term of this patent is extended or adjusted under 35 U.S.C. 154(b) by 389 days.

(21) Appl. No.: 17/295,998

(22) PCT Filed: Nov. 19, 2019

(86) PCT No.: PCT/IB2019/059928

§ 371 (c)(1),
(2) Date: May 21, 2021

(87) PCT Pub. No.: WO2020/104938

PCT Pub. Date: May 28, 2020

(65) Prior Publication Data

US 2021/0393003 A1 Dec. 23, 2021

(30) Foreign Application Priority Data

Nov. 22, 2018 (CH) .................................... 01446/18

(51) Int. Cl.
*A44C 5/20* (2006.01)
*A44C 5/14* (2006.01)
*G04B 37/14* (2006.01)

(52) U.S. Cl.
CPC .......... *A44C 5/145* (2013.01); *G04B 37/1486* (2013.01)

(58) Field of Classification Search
CPC ........... A44C 5/145; A44C 5/14; A44C 5/147; G04B 37/1486; G04B 37/16; F16B 7/22; F16B 7/0493; Y10T 24/4782; Y10T 403/59; Y10T 403/591; Y10T 403/598
USPC ........................... 403/325, 322.1, 409.1, 324
See application file for complete search history.

(56) References Cited

U.S. PATENT DOCUMENTS

| | | | | |
|---|---|---|---|---|
| 462,465 A * | 11/1891 | Berry | B60C 27/08 | 24/599.7 |
| 2,562,401 A * | 7/1951 | Wheeler | F16B 45/02 | 24/599.6 |

FOREIGN PATENT DOCUMENTS

| | | |
|---|---|---|
| DE | 640024 C | 12/1936 |
| EP | 0682300 A1 | 10/1995 |
| FR | 2634360 A1 | 7/1988 |

OTHER PUBLICATIONS

International Search Report for PCT/IB2019/059928 dated Jan. 15, 2020.

* cited by examiner

*Primary Examiner* — Jack W Lavinder
(74) *Attorney, Agent, or Firm* — Pearne & Gordon LLP

(57) ABSTRACT

An end piece arranged to be detachably fixed to a bar, the end piece including: a groove intended to house the bar; a rotating part able to pivot about an axis parallel to the bar between a locking position, in which the rotating part prevents the bar from leaving the groove, and a release position, in which the rotating part allows the bar to be respectively introduced into or extracted from the groove; and a locking mechanism arranged to block the rotation of the rotating part. This end piece can be handled by the user, who can fix it to a bar and detach it from the bar without requiring any tooling.

16 Claims, 5 Drawing Sheets

END PIECE

TECHNICAL FIELD

The present invention relates to an end piece, in particular an end piece arranged to be removably secured to a bar.

PRIOR ART

In this context, the term "end piece" designates an element arranged at the end of a part allowing assembly with another element, in particular with a bar.

The first link and the last link of a bracelet strand, for example of a bracelet for a wristwatch, constitute examples of end pieces. These links are generally formed differently from the other links of the bracelet, in order to allow assembly with the watch case and/or the clasp. Another example of an end piece is an element at the end of a strand of a leather goods item. The element at the end of a shoulder strap or handle, by which it can be connected to a handbag, is yet another example of an end piece. These examples are non-limiting, although in this context the use of the term end piece is preferred in the field of watchmaking, jewellery and leather goods.

The end piece can be secured, sometimes removably, to a bar. In the case of a bracelet, this bar may form part of a clasp, the end piece thus being able to be secured to the clasp.

In the case of a bracelet for a wristwatch, the bar can also form part of a watch case, the end piece thus being able to be secured to the watch case.

In this context, the term "bar" indicates a substantially linear element, for example an axis. A bar may be an element distinct from a watch case and connected (for example removably) to the watch case. A bar may also be an element of a one-piece watch case, which cannot be detached from the watch case. The end piece is generally linked, for example removably, to a part. It therefore makes it possible to link the part to a bar.

Non-limiting examples of parts that can be linked or removably attached to a bar via an end piece include: a strand of a bracelet, for example a strand of a wristwatch, or in general a strand of a leather goods item; a bracelet link, generally formed differently from an end piece, for example a link of a wristwatch or in general a link of a leather goods item; a bracelet; a necklace, etc.

This kind of end piece for the removable attachment of a part to a bar is known in principle, there have even been for many years a large number of devices for removably securing a watch bracelet to a wristwatch.

Most of these end pieces require watchmakers' tools to change the bracelet. Furthermore, these end pieces risk causing inadvertent detachment of the bracelet, cannot easily be integrated into existing watch cases, or suffer other disadvantages, such as not being aesthetically pleasing, which is important in this field.

Document DE640024 describes a device intended to be removably secured to a bar. This device comprises a cylinder, each end of which surrounds a semi-cylinder, having a protuberance carrying a coil spring. This device also comprises a grip part arranged to be manipulated by a user in order to unlock the device. This part is as one with a locking mechanism. The movement to lock and unlock the device is a rotational movement.

Document FR2634360 relates to means for securing a watch bracelet to a watch case. These means comprise a cylindrical body and a locking washer for this cylindrical body. This cylindrical body and this washer are coaxial and are each mounted on a pivot shaft, the ends of which are accommodated in the case by means of a coil spring. The assembly is kept in the locked position by an axial projection of the washer, a radial surface of which is intended to bear against a radial surface of an axial stop of the cylindrical body. The bracelet can be secured to the cylindrical body thanks to the presence, on the surface of the cylindrical body, of an axial channel delimited by a projection directed tangentially to the cylinder and parallel to the channel. This channel is intended to receive a portion of a securing bracket connected to the bracelet, while the projection is intended to be accommodated in the cutaway of the securing bracket.

None of these solutions allows the user to understand that it has been successfully secured to a bar.

There is therefore a need for an end piece that does not have these limitations of the prior art.

BRIEF SUMMARY OF THE INVENTION

An aim of the present invention is to provide an end piece which enables the user to understand that it has been successfully secured to a bar.

One aim of the present invention is to propose an end piece which can be removably secured to a bar by the user without requiring any tools.

One aim of the present invention is to propose an end piece which can be easily miniaturized and/or which can be adapted to elegant watches or watches for women.

One aim of the present invention is to propose an end piece which is compatible with existing watch cases, in particular watch cases comprising horns and a bar on each side, for securing the bracelet strands.

One aim of the present invention is to propose an end piece which is compatible with existing bracelets.

One aim of the present invention is to propose an end piece whose locking mechanism is not visible to the user when the part (for example a bracelet) is worn.

According to the invention, these aims are achieved in particular by means of an end piece as claimed in claim 1, a system according to claim 12, and a removable fixing method according to claim 15.

The end piece according to the invention is arranged to be removably secured to a bar, and comprises:

- a channel intended to accommodate said bar;
- a rotating part capable of pivoting about an axis parallel to the bar between a locking position in which the rotating part prevents the bar from leaving the channel, and a release position in which the rotating part allows the bar to be inserted into or removed from the channel;
- a locking mechanism arranged to block the rotation of the rotating part, in particular in the locking position.

The locking mechanism permits both locking and unlocking of the rotation of the rotating part.

The end piece can be handled directly by the user, without the need for any tools. To secure it to the bar, it is sufficient for the user to advance the bar into the channel of the end piece.

To detach the end piece from the bar, the user can actuate a locking element of the locking mechanism, for example via a grip part, for example by moving it linearly outwards, that is to say by moving it away from the rotating part, in particular along an axis parallel to the bar. It thus allows the rotating part to rotate in a direction opposite to that which had allowed the securing, which makes it possible to detach the end piece from the bar.

Advantageously, the parts of the end piece according to the invention can be easily miniaturized, so that the end piece according to the invention can also be adapted to elegant watches or watches for women.

Advantageously, the end piece according to the invention can be secured to a bar. This bar may for example be the small metal rod which is already secured between the horns of the case and on which the bracelet is fitted. If this bar is not present in an existing watch case, it can be added, for example by securing it by welding or by any other removable or non-removable securing means, to the horns or in general to the watch case. The end piece according to the invention is therefore compatible or can be made compatible with existing watch cases, provided that these cases comprise a bar or that this bar can be added.

Advantageously, when the end piece according to the invention is worn by the user, the locking mechanism is not visible to the user. This end piece is therefore safe, because the risk of inadvertent detachment is very low or even zero, and improves the appearance of the part in which it is inserted, for example a bracelet of a wristwatch.

According to the invention, the rotating part comprises a first surface (for example comprising the groove), and the locking mechanism comprises:

- a first locking element on a second surface of the rotating part,
- a second locking element in the end piece.

According to the invention, upon rotation of the rotating part, the relative position between the second surface and the second locking element changes until the second locking element cooperates with the first locking element so as to block the rotation of the rotating part in the locking position.

According to the invention, the first locking element is a hole in the second surface and the second locking element is a lever, one end of the lever facing the second surface. Upon rotation of the rotating part about the axis, the relative position between the second surface and the lever changes until the lever drops into the hole, thus blocking the rotation of the rotating part in the locking position. Advantageously, when the lever falls into the hole, it makes an audible click which allows the user to understand that the securing has been carried out successfully.

In one variant, the rotating part has an asymmetric shape arranged to block or release the bar. In another variant, the rotating part comprises a groove extending in the direction of the axis, the groove comprising a first bottom.

In one variant, the end piece comprises an entry surface, this entry surface comprising a recess and the channel, the channel comprising a second bottom and two lateral surfaces, the rotating part being engaged in the recess.

In one variant, in the release position, the first bottom is opposite the entry surface or one of the two lateral surfaces of the end piece, and in the locking position, the first bottom is located opposite the second bottom, so that both the first bottom and the second bottom surround the bar, thus securing the end piece to the bar.

Advantageously, the actuation of the second locking element during the detachment of the end piece from the bar is carried out from below. In the case where the end piece is linked to a bracelet, for example a bracelet of a wristwatch, the expression "from below" indicates the part which is in contact with the user when the bracelet is worn.

Advantageously, the actuation of the second locking element during the detachment of the end piece from the bar is carried out laterally, that is to say along an axis substantially parallel to the bar, or in other words perpendicular to the main direction of the part to which the end piece according to the invention can be attached (for example the length of a bracelet of a wristwatch). In other words, in one variant the locking mechanism is arranged to act in a direction parallel to the bar, the second locking element allowing unlocking of the end piece being movable parallel to the bar and being located under one face of the end piece, which face is intended to be against the user when the end piece is worn by the user.

Advantageously, when securing the end piece to the bar, the user can cause the bar to engage in the end piece by bringing the end piece to the bar from above (that is to say, by the part which is not in contact with the user when wearing the part, for example a bracelet).

The present invention also relates to a system comprising

- the end piece according to the invention,
- a bar.

In one variant, the bar is dimensioned so that when the bar advances in the channel, it comes into contact with the rotating part, causing it to rotate about the axis.

In one variant, the system also comprises a part linked to the end piece according to the invention, for example a bracelet, in particular a bracelet for a wristwatch.

Advantageously, the locking mechanism is not visible to the user when the part is worn.

The present invention also relates to a method for removably securing an end piece to a bar, the end piece comprising

- a rotating part comprising a first surface and a second surface, the second surface comprising a first locking element which is a hole in the second surface,
- a second locking element which is a lever, one end of the lever being opposite said second surface, the method comprising the following steps:

- accommodating the bar in a channel of the end piece;
- pivoting a rotating part about an axis parallel to the bar between a locking position in which the rotating part prevents the bar from leaving the channel, and a release position in which the rotating part allows the bar to be inserted into or removed from the channel, wherein during the pivoting of the rotating part, the relative position between the second surface and the lever changes;
- locking the position of the rotating part by means of a locking mechanism when the lever drops into the hole, thus blocking the rotation of the rotating part.

BRIEF DESCRIPTION OF THE FIGURES

Exemplary embodiments of the invention are indicated in the description illustrated by the appended figures, in which.

EXEMPLARY EMBODIMENT(S) OF THE INVENTION

Figure 1:
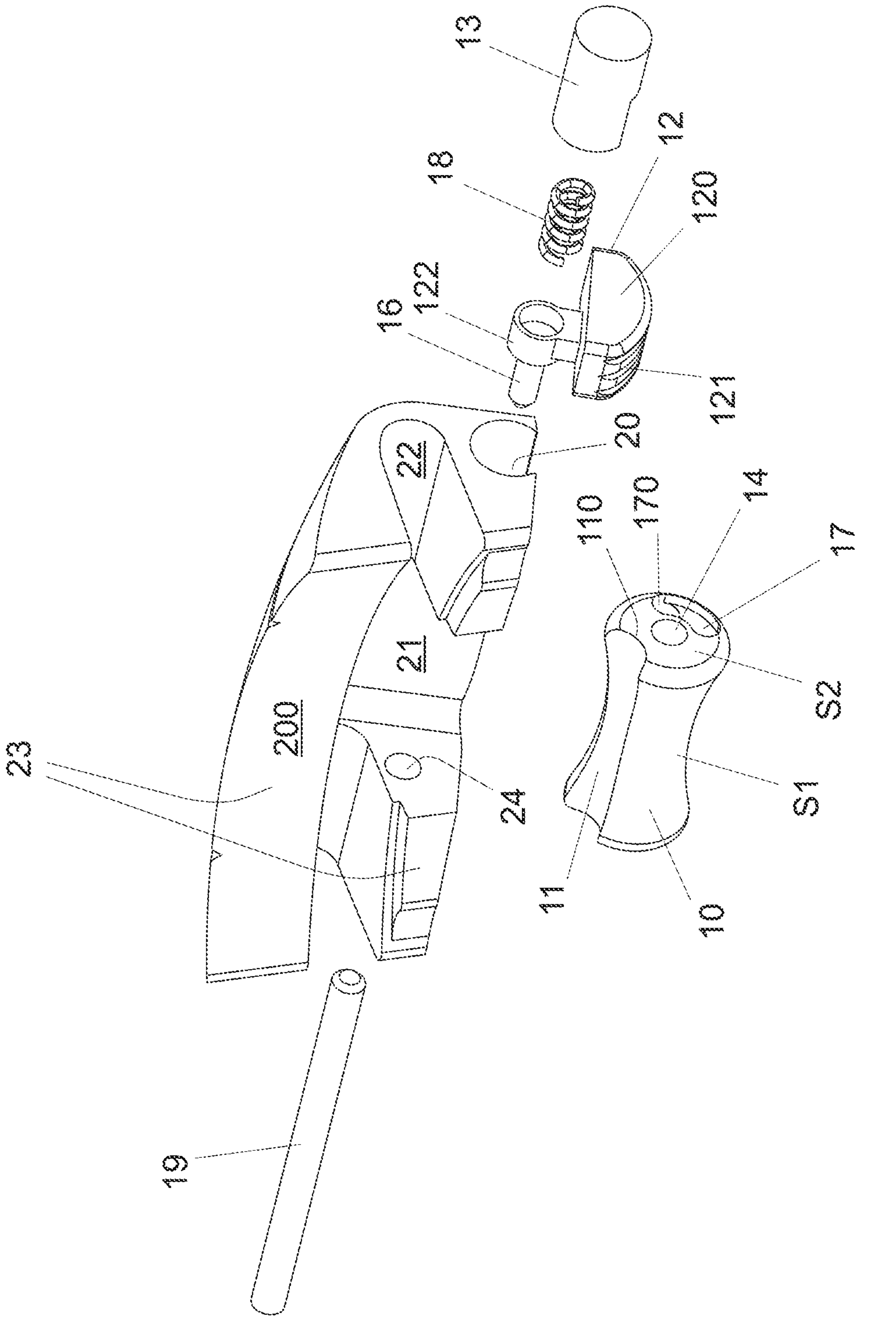
FIG. 1 shows an exploded perspective view of an embodiment of the end piece according to the invention.

FIG. 1 shows an exploded perspective view of an embodiment of the end piece 200 according to the invention. It can be removably secured to a bar, for example a watch case bar (not shown). At least part of the bar is intended to engage in the channel 22 of the end piece 200.

In the variant shown, the end piece 200 comprises a rotating part 10, which has an essentially cylindrical shape, for example in the shape of a roller. This rotating part 10 is arranged to rotate about an axis 19. In the variant shown, the axis is substantially parallel to the channel 22 of the end piece 200 (and therefore to the bar). In the illustrated variant, the axis 19 is arranged to link the rotating part 10 to the end piece 200.

In the illustrated variant, the rotating part 10 comprises:

a first surface S1, comprising a groove 11 extending in the direction of the axis 19, a second surface S2, comprising a first locking element 170.

As will be seen, the groove 11 makes it possible to block or release the bar. It should however be understood that the presence of this groove 11 is not necessary to block or release the bar, and that the rotating part 10 could have a shape arranged to block or release the bar, for example an asymmetrical shape, without necessarily comprising a groove.

In the example shown, the first locking element 170 is a hole, in particular a blind hole, in the surface S2. This can be obtained for example by drilling the surface S2. In the example shown, this hole 170 is located at the end of a guide groove 17 in the surface S2.

In the example shown, a second locking element 16 is located opposite and/or in contact with the second surface S2. In the example shown, the second locking element is a lever 16, one end of which is in contact with the second surface S2 under the action of an elastic element (the spring 18 in the example shown).

The diameter of the rotating part 10 is not constant along its length. Indeed, its diameter is larger at the ends, so as to have more room for cooperation between the first locking element and the second locking element.

In the example of FIG. 1, the second surface S2 of the rotating part 10 is substantially perpendicular to the axis 19, however according to variants, the angle between the second surface S2 and the axis 19 may be different from 90°.

The rotating part 10 is accommodated in a recess 21 provided in the end piece 200. In the variant shown, the end piece 200 comprises holes 24 (only one of which is visible in FIG. 1), which serve for receiving the axis 19. The axis is therefore inserted into these holes 24 and then into a hole 14 passing through the rotating part 10, so as to allow the rotating part 10 to be secured to the end piece 200. Other connection means can be provided to link (directly or indirectly) the rotating part 10 to the end piece 200 via the axis 19.

Figure 2:
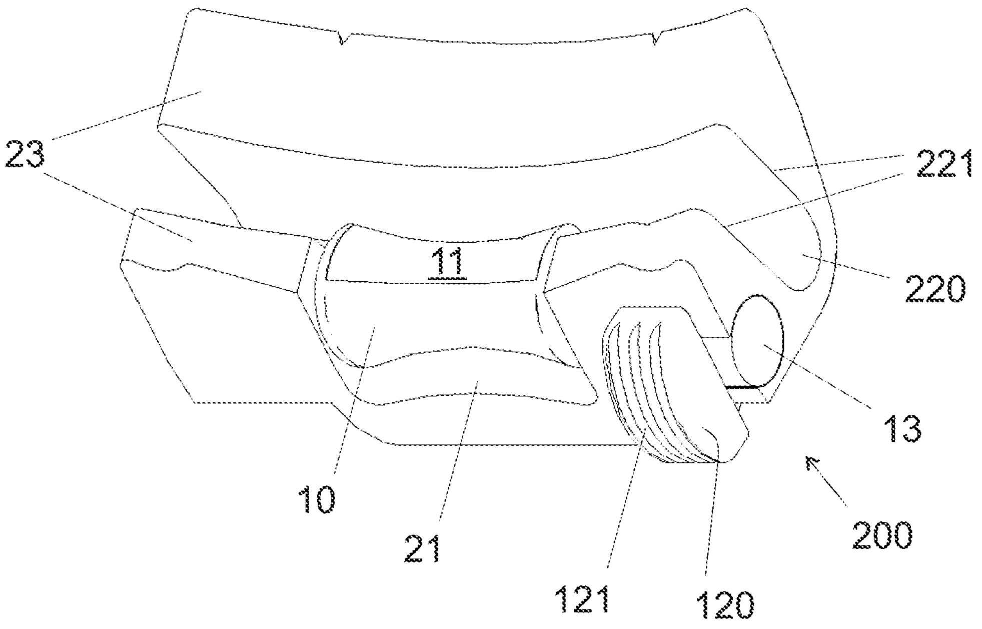
FIG. 2 shows another perspective view of an embodiment of the end piece according to the invention.

As is better shown in FIG. 2, the channel 22 of the end piece 200 comprises a bottom 220. This can be obtained by cutting away the end piece 200, in particular its entry surface 23.

In the variant of FIG. 1, the spring 18 (or any other elastic element) cooperates with the lever 16 so that at rest (that is to say in the release position) the lever is pushed by the spring 18 against the second surface S2 of the rotating part 10. In other words, the spring 18 at rest is compressed and stores elastic energy.

In the variant of FIG. 1, a plug 13 receives both the lever 16 and the elastic element 18. In another variant, the plug 13 receives the lever 16 or the elastic element 18.

In the variant of FIG. 1, the end piece 200 comprises another recess 20 for receiving the lever 16 and possibly also the elastic element 18 and the plug 13.

In the variant of FIG. 1, a grip part 12 is as one with the lever 16 (or in general with the second locking element). It is arranged to be manipulated by a user to unlock the end piece 200. In the variant of FIG. 1, the grip part 12 comprises a body 120, having a section substantially in the shape of a semi-circumference, and a ring 122, allowing it to be connected to the lever 16. In particular, the lever 16 is inserted into the ring 122.

The grip part 12 also has grooves 121, to make it easier for the user to grip. The grip part 12 is arranged to come into contact with the user. Its shape and dimensions allow it to be handled by the fingers of a user while allowing this contact with the user to be as pleasant as possible.

FIG. 2 shows another perspective view of an embodiment of the end piece 200 according to the invention, at rest.

Figure 3:
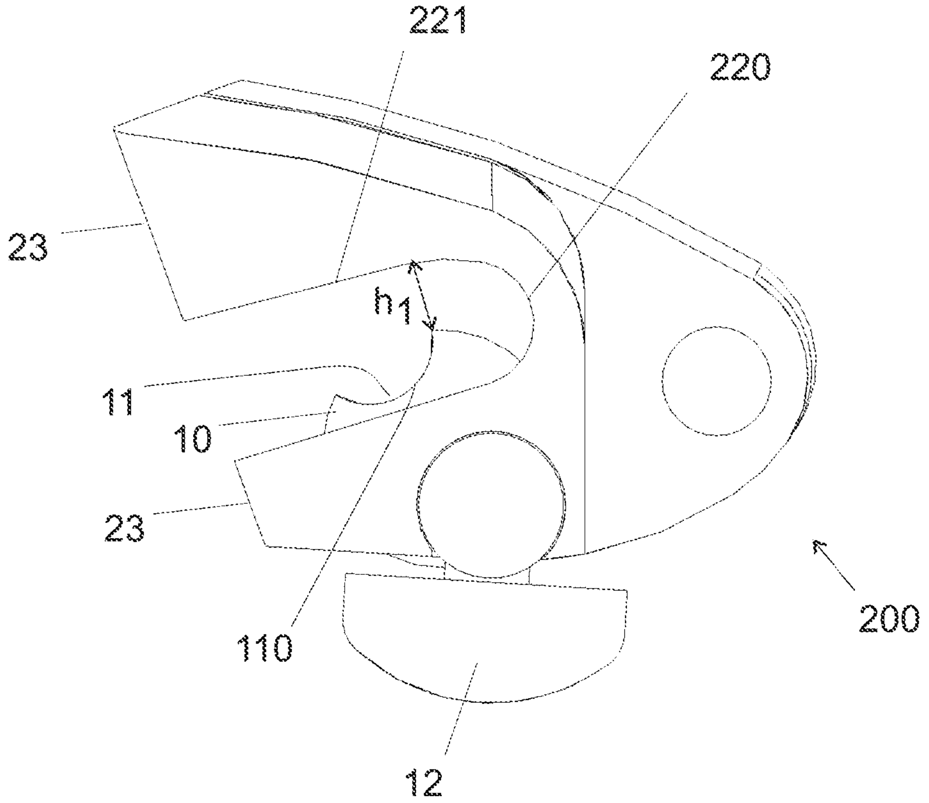
FIG. 3 shows a side view of the embodiment of the end piece of FIG. 2.
Figure 6:
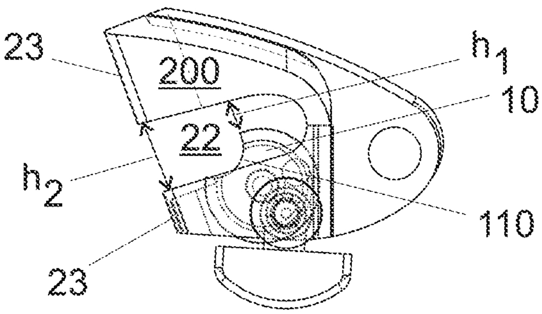
FIG. 6 shows a side view of the embodiment of the end piece of FIG. 1, when the end piece is not secured to a bar.

As can be seen in FIG. 3, which shows a side view of the embodiment of the end piece 200 of FIG. 2, the bottom 110 of the groove 11 of the rotating part 10 is not located opposite the bottom of the channel 22 of the end piece 200. As is clearer from FIG. 3, the bottom 110 of the groove 11 is opposite a lateral surface 221 of the channel 22 of the end piece 200. In the variant of FIG. 6, which illustrates another side view of the embodiment of the end piece 200, the bottom 110 of the groove 11 of the rotating part is substantially opposite the entry surface 23 of the end piece 200.

Figure 4:
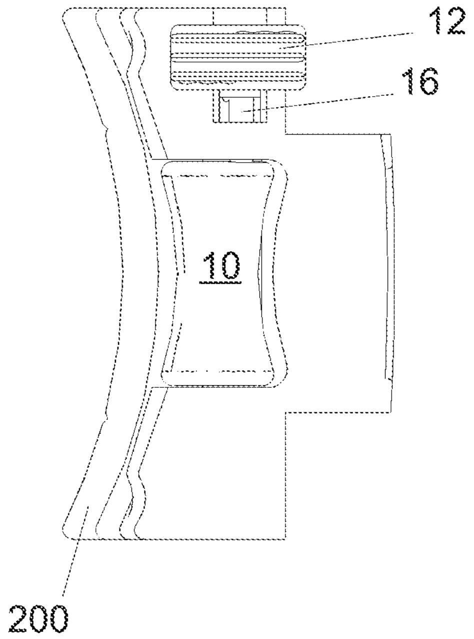
FIG. 4 shows a view from below of the embodiment of the end piece of FIG. 2.
Figure 5:
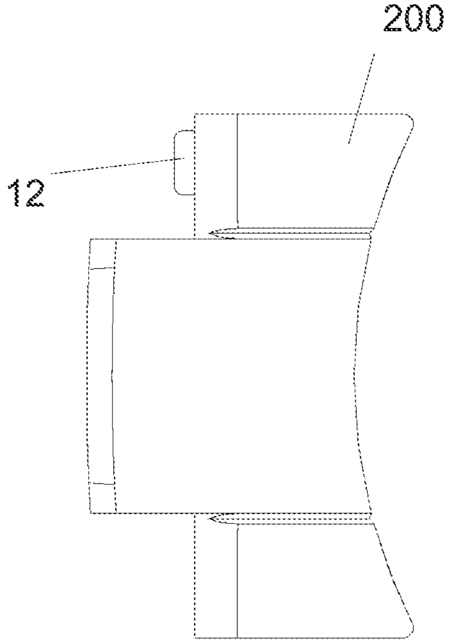
FIG. 5 shows a view from above of the embodiment of the end piece of FIG. 2.

FIG. 4 shows a view from below of the embodiment of the end piece 200 of FIG. 2, on the user side. FIG. 5 shows a view from above of the embodiment of the end piece 200 of FIG. 2. In FIG. 5, a small part of the grip part 12 is visible to the user. However, this part of the grip part 12 will be hidden by the part (for example a bracelet whose end piece represents the first link).

FIG. 6 shows a side view of the embodiment of the end piece 200 of FIG. 1, when the end piece 200 is not secured to the bar.

When the user inserts the bar into the channel 22 of the end piece 200 (or brings the end piece 200 close to the bar), the bar engages in the channel 22, the height of the bar being smaller than the height h2 of channel 22.

Since the rotating part 10 is engaged in the recess 21 of the end piece 200 so that, in the release position, the first bottom 11 is facing the inlet surface 23 or one of the two side surfaces 221 of the channel 22, the height available for advancing the bar in the channel 22 is not constant and varies between a maximum value (the height h2 of the channel 22 at the entry surface 23) and a minimum value h1.

In a preferred variant, the height of the bar is between h2 and h1.

Figure 7:
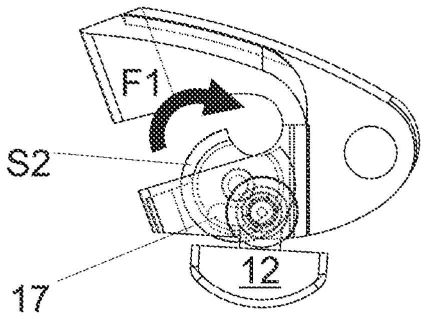
FIG. 7 shows the side view of FIG. 6, when the end piece is secured to a bar (not shown).

As the bar continues to advance in the channel 22 of the end piece 200 under the action of the user pushing it, and as the rotating part 10 is free to rotate about its axis 19, at a given moment it comes into contact with the rotating part 10, making it rotate about its axis 19 in the direction of rotation indicated by the arrow F1 in FIG. 7.

In the example shown in FIGS. 6 and 7, when this rotation takes place, the relative position between the second surface S2 of the rotating part 10 and the second locking element (the lever 16) changes until the second locking element cooperates with the first locking element (the hole 170) so as to block the rotation of the rotating part 10 in the locking position.

In the locking position, the first bottom 110 is located opposite the second bottom 220, so that both the first bottom 110 and the second bottom 220 surround the bar, thus securing the bar to the end piece 200 (or the end piece 200 to the bar).

In the variants of FIGS. 1, 6 and 7, the second surface S2 of the rotating part 10 comprises a guide groove 17 to guide the relative movement between the second surface S2 of the rotating part 10 and the second locking element (the lever 16). In these variants, the first locking element is a hole 170 at one end of this guide groove 17. The guide groove 17 can therefore also serve to limit the rotation of the rotary element 10.

When the lever 16 drops into the hole 17, thus blocking the rotation of the rotating part 10 in the locked position, there may be an audible click, which allows the user to understand that the securing has been carried out successfully.

In correspondence with the release position (illustrated for example in FIG. 2, 3 or 6), the rotating part 10 does not rotate if a bar is not engaged in the channel 22 of the end piece. In one variant, this is obtained by simple friction of the rotating part 10 against the end piece 200.

Figure 8:
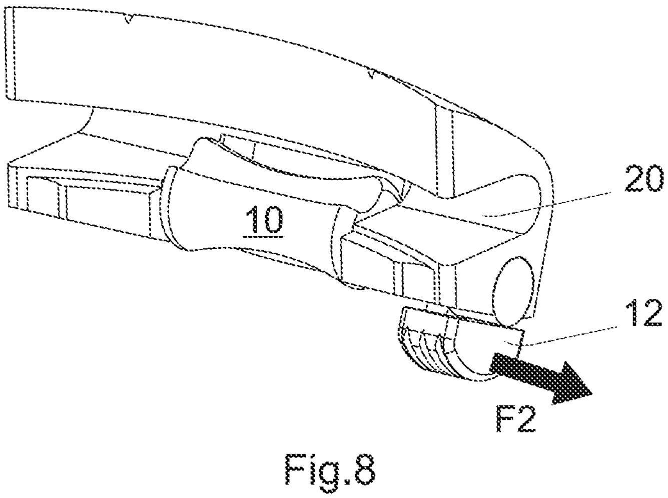
FIG. 8 shows the side view of FIG. 6, when the end piece is detached from a bar (not shown).

To unlock the end piece 200, the second locking element (the lever 16 for example) is moved away from the rotating part 10 as illustrated by the arrow F2 parallel to the bar (FIG. 8), therefore allowing the rotating part 10 to pivot when the second locking element is pulled out. The part 10 is rotated in a direction counter to the direction of rotation during the engagement of the bar (that is to say in a direction counter to that of the arrow F1 in FIG. 7).

Advantageously, the actuation of the second locking element during the detachment of the end piece 200 from the bar takes place from below the part (for example a bracelet of a wristwatch) to which the end piece 200 is linked.

Advantageously, the actuation of the second locking element during the detachment of the end piece 200 from the bar takes place laterally, that is to say parallel to the bar.

In one variant, the recess 20 for receiving the lever 16 is arranged to allow the lever 16 to move counter to the elastic force of the elastic member 18 so as to cause it to exit from the hole 170, the movement being substantially linear in the direction of the bar.

As the grip part 12 experiences a force when unlocking the end piece 200, in one variant it is made of a material which is strong in tension, for example metal. It can also be made of a hypo-allergenic material (since it comes into contact with the user's skin) and which makes it easier to grip, for example rubber.

REFERENCE NUMBERS USED IN THE FIGURES

11 Groove of the rotating part (groove)
12 Grip part
13 Cap
14 Hole of the rotating part
16 Second locking element (lever)
17 Guide groove
18 Elastic element
19 Axis
21 First recess
20 Second recess
22 Channel
23 Entry surface
110 Bottom of the groove of the rotating part
120 Body of the grip part
121 Grip groove
122 Ring
170 Hole
200 End piece
220 Bottom of the channel
221 Side walls of the channel
S1 First surface of the rotating part
S2 Second surface of the rotating part
F1 Arrow
F2 Arrow
h1 Minimum value of the available height for the advance of the bar in the channel
h2 Maximum value of the available height for the advance of the bar in the channel (height of the channel)

What is claimed is:

1. An end piece configured to be removably secured to a bar, said end piece comprising:
a channel configured to accommodate said bar;
a rotating part configured to rotate about an axis parallel to said bar between a locking position for preventing the bar from leaving said channel, and a release position in which the rotating part allows the bar to be inserted into or removed from the channel, said rotating part comprising a first surface and a second surface;
a locking mechanism configured for blocking-rotation of the rotating part, the locking mechanism comprising:
a first locking element on the second surface of the rotating part, wherein said first locking element is a hole in the second surface, and
a second locking element in the end piece, wherein said second locking element is a lever, one end of said lever being opposite said second surface,
wherein upon rotation of said rotating part, the relative position between the second surface and said second locking element changes until said second locking element cooperates with said first locking element so as to block the rotation of said rotating part in the locking position,
wherein upon rotation of said rotating part, the relative position between the second surface and said lever changes until said lever drops into said hole, thus blocking the rotation of said rotating part in the locking position, and
wherein said locking mechanism is configured to act in a direction parallel to the bar, said second locking element being movable parallel to the bar.

2. The end piece as claimed in claim 1, wherein the rotating part has an asymmetric shape arranged to block or release the bar.

3. The end piece as claimed in claim 1, comprising said axis, the rotating part comprising a groove extending in a direction of said axis, said groove comprising a first bottom.

4. The end piece as claimed in claim 1, comprising an entry surface, said entry surface comprising a recess and said channel, said channel comprising a second bottom and two lateral surfaces, said rotating part being engaged in said recess.

5. The end piece as claimed in claim 4, wherein:
in said release position, the first bottom is opposite said entry surface or one of the two lateral surfaces,
in the locking position, the first bottom is located opposite the second bottom, so that both said first bottom and said second bottom can surround the bar, thus securing the end piece to the bar.

6. The end piece as claimed in claim 1, comprising an elastic element that cooperates with said lever so that, at rest, said lever is pushed by said elastic element towards said second surface of said rotating part.

7. The end piece as claimed in claim 6, comprising a plug comprising said lever and/or said elastic element.

8. The end piece as claimed in claim 6, said end piece comprising another recess for receiving said lever, the another recess being configured to allow movement of said lever that is counter to an elastic force of said elastic member so as to cause the lever to exit from said hole, said movement being substantially linear in a direction of said bar.

9. The end piece as claimed in claim 1, said second surface comprising a guide groove, one end of said guide groove comprising said hole.

10. The end piece as claimed in claim 1, said second locking element being movable parallel to the bar and being located under a face of the end piece, the face configured to be against a user when the end piece is worn by the user.

11. The end piece as claimed in claim 1, said locking mechanism comprising a grip part configured to be manipulated by a user in order to unlock the end piece.

12. A removable securing system comprising:

the end piece as claimed in claim 1, and the bar.

13. The system as claimed in claim 12, said bar being dimensioned so that when the bar advances in the channel, the bar comes into contact with the rotating part, causing the rotating part to rotate about said axis.

14. The system as claimed in claim 12, comprising a part linked to the end piece, said part being a bracelet.

15. The system as claimed in claim 14, wherein said bracelet is configured for a wristwatch.

16. A method for releasably securing an end piece to a bar, said end piece comprising:

a rotating part comprising a first surface and a second surface, and a locking mechanism configured for blocking rotation of the rotating part, the locking mechanism including a first locking element which is a hole in the second surface, and a second locking element which is a lever, one end of said lever being opposite said second surface, said method comprising the following steps:

accommodating said bar in a channel of said end piece;

rotating the rotating part about an axis parallel to said bar between a locking position in which the rotating part prevents the bar from leaving said channel, and a release position in which the rotating part allows the bar to be inserted into or removed from the channel, wherein during rotation of said rotating part, the relative position between the second surface and said lever changes; and locking a position of the rotating part when said lever drops into said hole, thus blocking the rotation of said rotating part, wherein said locking mechanism is configured to act in a direction parallel to the bar, said second locking element being movable parallel to the bar.

* * * * *